US008713477B2

(12) United States Patent
Bicker et al.

(10) Patent No.: US 8,713,477 B2
(45) Date of Patent: Apr. 29, 2014

(54) PRESENTING A LINK TO A USER

(75) Inventors: Sandra Bicker, Heidelberg (DE); Iris Nieder, Walldorf (DE); Annett Hardt, Mannheim (DE); Ingo Deck, Mannheim (DE); Erik Oster, Heidelberg (DE); Till Brinkmann, Mannheim (DE); Boris Bierbaum, Frankfort/Main (DE); Martin Dauer, Alsting (FR); Theo Held, Wiesloch (DE); Martin Schrepp, Hockenheim (DE)

(73) Assignee: SAP AG, Walldorf (DE)

( * ) Notice: Subject to any disclaimer, the term of this patent is extended or adjusted under 35 U.S.C. 154(b) by 1087 days.

(21) Appl. No.: 11/618,381

(22) Filed: Dec. 29, 2006

(65) Prior Publication Data

US 2007/0266341 A1 Nov. 15, 2007

Related U.S. Application Data

(60) Provisional application No. 60/800,055, filed on May 12, 2006.

(51) Int. Cl.
 *G06F 3/048* (2013.01)

(52) U.S. Cl.
 USPC .............................. 715/810; 715/866; 715/764

(58) Field of Classification Search
 USPC ................................................. 715/866, 810
 See application file for complete search history.

(56) References Cited

U.S. PATENT DOCUMENTS 5,742,768 A * 4/1998 Gennaro et al. ............... 709/203
2003/0154232 A1* 8/2003 Beringer et al. .............. 709/102

2004/0128294 A1* 7/2004 Lane et al. .................... 707/100
2004/0131050 A1* 7/2004 Beringer et al. .............. 370/352
2007/0265929 A1* 11/2007 Danninger ...................... 705/26

FOREIGN PATENT DOCUMENTS

EP 1 244 010 3/2001

OTHER PUBLICATIONS

P. Monson et al., "IBM Workplace Services Express" Jul. 28, 2005, IBM—IBM Redbooks.*
'Building a Mouse-Over Menu Using CSS' [online]. Interspire, published Dec. 5, 2005, [retrieved on Dec. 29, 2006]. Retrieved from the Internet: <URL: www.interspire.com/content/articles/8/1/Building-a-Mouse-Over-Menu-Using-CSS>, 6 pages.
'GP Work Center' [online]. SAP, [retrieved on Dec. 29, 2006]. Retrieved from the Internet: <URL: www.help.sap.com/saphelp_crm50/helpdata/en/1d/407b423737dc54e10000000a155106/c>, 2 pages.

* cited by examiner

*Primary Examiner* — Tadeese Hailu
*Assistant Examiner* — Darrin Hope
(74) *Attorney, Agent, or Firm* — Fish & Richardson P.C.

(57) ABSTRACT

Presenting links to a user includes: (i) identifying at least one of several work center screens to be made available to a user on a screen. Each work center screen is customizable and contains role-specific information associated with a topic in an enterprise resource computing system. (ii): for each identified work center screen, any screen of a particular type to which the user can directly navigate from the work center screen is identified. (iii): the screen includes: (A) for each identified work center screen, a first link providing navigation to the corresponding work center screen, and (B) for each first link, a second link to each screen of the particular type identified for the corresponding work center screen, providing navigation to the identified screen without visiting the work center screen, the second link displayed to indicate an association with the first link.

15 Claims, 6 Drawing Sheets

PRESENTING A LINK TO A USER

CROSS-REFERENCE TO RELATED APPLICATIONS

This application claims priority from U.S. Provisional Application No. 60/800,055, filed May 12, 2006, and entitled "UI Concept," the entire contents of which are incorporated herein by reference.

TECHNICAL FIELD

This document relates to a user interface.

BACKGROUND

Large software systems, for example enterprise resource planning (ERP) or customer relationship management (CRM) systems, can be designed to work with a great number of different object types. In a CRM system from SAP AG, for example, there are the object types accounts, contact persons, campaigns, target groups, orders, opportunities, to name a few examples. A user working with instances of these objects may need to create new objects of a specified type, create a new object type, or search for objects.

These types of systems often organize the available information according to one or more principles. For example, it can be organized in semantically related groups, which is a collection of information, either presented directly or indirectly represented by a link to the information. Such groups can then be made available to users in one or more ways, for example by displaying it on a page. In a complex system where there is plenty of information relating to the semantic group, such a presentation can be relatively voluminous and contain a significant amount of information or links.

SUMMARY

The invention relates to presenting a link to a user.

In a first general aspect, a computer-implemented method for presenting links to a user includes (i) identifying at least one of several work center screens to be made available to a user on a screen. Each of the work center screens is customizable and contains role-specific information associated with a topic in an enterprise resource computing system. The method includes (ii) identifying, for each work center screen identified in step (i), any screen of a particular type to which the user can directly navigate from the work center screen. The method includes (iii) including on the screen: (A) a first link for each work center screen identified in step (i), the first link providing navigation from the screen directly to the corresponding work center screen, and (B) for each such first link, a second link to each screen of the particular type identified for the corresponding work center screen in step (ii), the second link providing navigation from the screen directly to the screen identified in step (ii) without visiting the work center screen, the second link being displayed so as to indicate an association with the corresponding first link.

Implementations can include some or all or none of the following features. The identification in step (i) can be performed based on a role assigned to the user. The identification in step (ii) can be performed based on a role assigned to the user. The particular type of screen being identified in step (ii) can be a search screen. The method can further include performing step (ii) for each identified screen of the particular type, and including a third link on the screen, the third link providing navigation directly from the screen to a screen identified as being one to which the user can navigate from the screen of the particular type. The identification in performing step (ii) for each identified screen of the particular type can be done based on a role assigned to the user. The second link can be included in a sub-menu to the first link. The sub-menu can initially be not displayed, and the method can further include displaying the second link upon the user placing a cursor on the first link in the screen. The screen can include several first links, each corresponding to a separate work center screen, and the second link can be associated with one of the first links. At least some of the first links can be associated with corresponding second links identified in step (ii).

In a second general aspect, a computer program product is tangibly embodied in an information carrier and includes (i) a work center management module for identifying at least one of several work center screens to be made available to a user on a screen. Each of the work center screens is customizable and contains role-specific information associated with a topic in an enterprise resource computing system. The computer program product includes (ii) a link management module for identifying, for each work center screen identified by the work center management module, any screen of a particular type to which the user can directly navigate from the work center screen. The computer program product includes (iii) a screen management module for including on the screen: (A) a first link for each work center screen identified by the work center management module, the first link providing navigation from the screen directly to the corresponding work center screen, and (B) for each such first link, a second link to each screen of the particular type identified for the corresponding work center screen by the link management module, the second link providing navigation from the screen directly to the screen identified by the link management module without visiting the work center screen, the second link being displayed so as to indicate an association with the corresponding first link.

In a third general aspect, a computer program product is tangibly embodied in an information carrier and includes instructions that, when executed, generate on a display device a graphical user interface for presenting links to a user. The graphical user interface includes a screen including a first link and a second link. The first link is to a work center screen that is customizable and contains role-specific information associated with a topic in an enterprise resource computing system. The first link provides that a user can navigate from the screen directly to the work center screen. The first link is displayed in response to identifying the work center screen as one that is to be made available to the user on the screen. The second link is to a screen of a particular type. The second link provides that the user can navigate from the screen directly to the screen of the particular type without visiting the work center screen. The second link is displayed in response to identifying the screen of the particular type as one to which the user can navigate from the work center screen. The second link is displayed so as to indicate an association with the corresponding first link.

Implementations can include some or all or none of the following features. The screen can further include a third link providing navigation directly from the screen to a screen identified as being one to which the user can navigate from the screen of the particular type. The second link can be included in a sub-menu to the first link. The sub-menu can initially be not displayed, and the graphical user interface can display the second link upon the user placing a cursor on the first link in the screen. The screen can include several first links, each corresponding to a separate work center screen, and the second link can be associated with one of the first links.

Implementations can provide some or all or none of the following advantages. Providing an improved grouping of information. Providing an improved presentation of a link to a user. Providing a shortcut for a user to reach a feature that is available in a semantically related group. Providing an improved approach for elevating selected page content to a higher level in a user navigation hierarchy.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
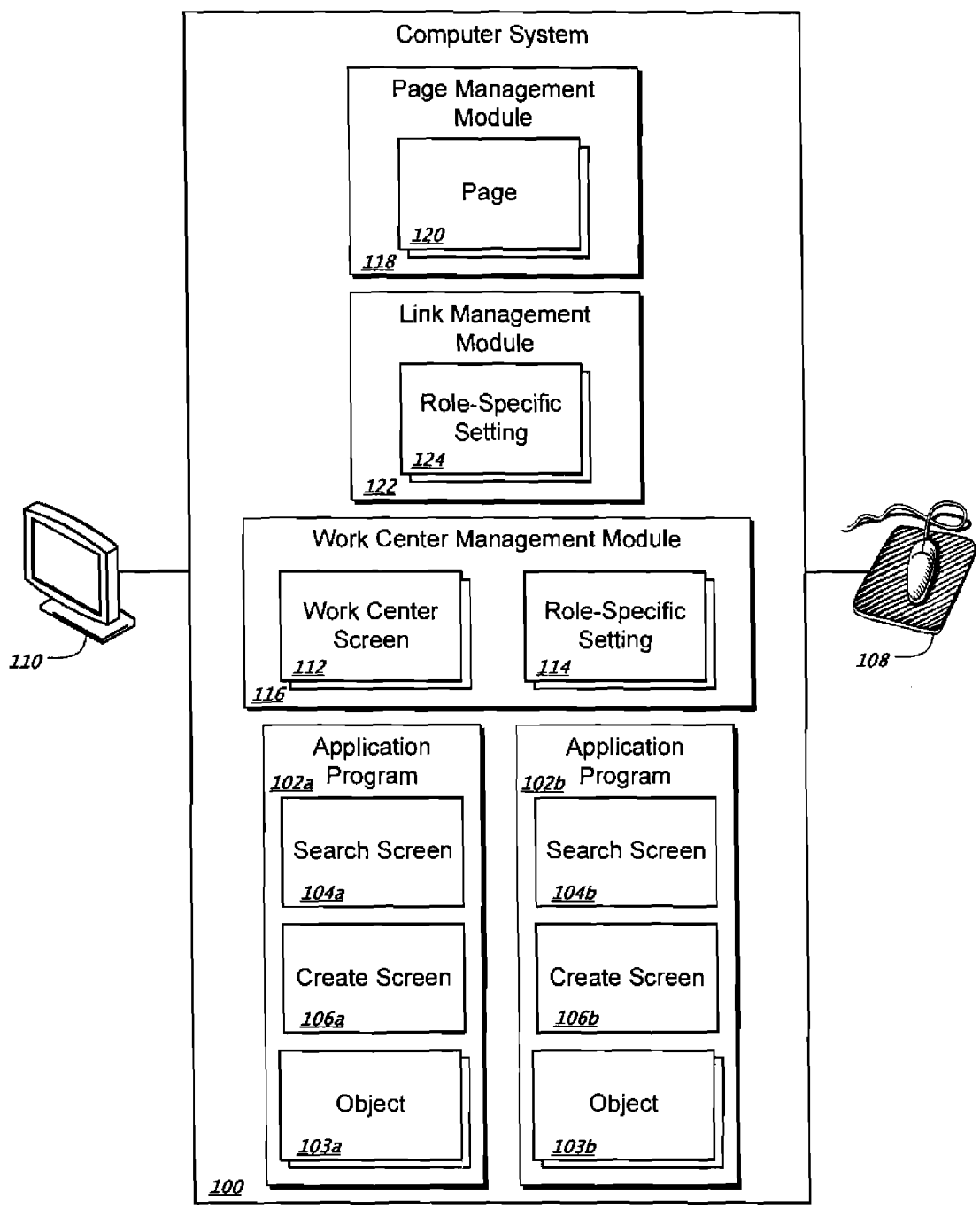
FIG. 1 is a block diagram of a computer system for presenting one or more screens.

FIG. 1 shows a block diagram of a computer system 100, such as an enterprise resource computer system that manages one or more corporate databases. The computer system 100 has one or more application programs 102 which in this example can handle customer relationship management (CRM) features such as products, accounts, customer records, marketing campaigns, sales orders, etc. Any number of application programs 102 may exist within the computer system 100. Each application program 102 is associated with a one or more types of object 103, e.g. a product or customer record, used in a CRM system. Application programs 102 provide a user with access to the different types of objects 103 available within the system. For example, a user may have the capability of adding to, searching for, or generating reports on the records created under a particular type of object 103 and also to create new objects and modify existing ones.

A first application program 102a associated with, for example, a customer object type 103a, provides access to customer records. The application program 102a has a search screen 104a for locating particular records of the customer object type 103a and a create screen 106a for creating new customer records. The search screen 104a can locate customer records based on any field within the customer object type 103a, e.g. customer name, customer location, etc. The create screen 106a may contain a fill-in-the-blanks method of creating a new customer record. The screens are reachable by making predefined inputs into the system as will be described.

A second application program 102b, associated with, for example, a marketing campaign object type 103b, provides access to marketing campaign records. The application program 102b has a search screen 104b for locating particular records of the campaign object type 103b and a create screen 106b for creating new campaign records. The search screen 104b can locate campaign records based on any field within the campaign object type 103b, e.g. product name, campaign start date, etc. The create screen 106b may contain a fill-in-the-blanks method of creating a new marketing campaign record. The screens are reachable by making predefined inputs into the system as will be described.

The computer system 100 has one or more input devices 108 and one or more output devices 110 which allow users to interact with the computer system 100 and any or all of the application programs 102. The input device 108 may be a mouse, a trackball, or any other device by which the user can provide input to the computer. The output device 110 may be a CRT (cathode ray tube) or LCD (liquid crystal display) monitor for displaying information to the user or any other graphic display device.

The content available within application programs can be grouped together on work center screens 112. The work center screens 112 may contain links to search screens 104, create screens 106, report generation screens, existing objects or reports, or any information creation, modification, and/or retrieval tool available within application programs 102a, to name some examples. For example, the work center can group information that is semantically related to a topic in the system. Work center screens 112 can relate to one or more of the application programs 102 and, thus, to a particular type of object 103 within the CRM system. The work centers are here described in terms of "screens" and this term is used herein to have the same meaning as a "page".

The content provided within a work center screen 112 may be determined by the role of a particular user. For instance, role-specific content may be displayed within the work center screen 112 based upon access rights, duty requirements, etc. of a user's employee division. Role-specific settings 114 contain information regarding which search screens 104, create screens 106, or other content should be available on a specific work center screen to a user having a particular role. For example, the role-specific settings 114 can define that a sales person be provided with access to a customer record creation screen and a customer record search screen, while a marketing person may be allowed to search customer records or generate reports on customer records but not to create a new customer record. The computer system 100 may contain any number of employee role-specific settings 114, and each role definition can be associated with selected tools related to one or more application programs 102 which are to be displayed within the work center screens 112.

A work center management module 116 manages the available work center screens 112. In one implementation, the work center management module 116 populates the work center screens 112 with tools available within the application programs 102, based upon a user's role-specific setting 114. The population can be done dynamically upon the user requesting the work center screen, for example. This allows the work center screens 112 to be uniquely customized and automatically generated for each individual user depending upon the role-specific setting 114 associated with that user. For example, an administrator can customize any of the work center screens to contain a specific feature or content. As another example, a user can specify the features or contents for a work center screen in a personalization setting.

The computer system 100 has a page management module 118 for generating pages 120. A page 120 provides access to the various work center screens 112. For example, the page 120 may be an overview page that is configured to include overview information about an object and navigation links to one or more work centers. As another example, the page 120 may be a search page, create page, or any other type of page, that includes navigation links to one or more work centers. That is, the one or more pages 120 include links that can be selectively activated to provide navigation to each work center screen 112 available to the user. A link may be created using any navigation tool providing access from one page, screen, or presentation of information to the presentation of a new set of information. In one implementation, a link may be an HTML hyperlink embedded within text or graphics.

In another implementation, links can be configured for object-based navigation, for example so that an object identifier and an object type are transmitted when the link is activated. The transmitted information can be used to determine the proper target for the navigation, optionally by also taking into account the user's role.

Role-specific content may be provided within the page 120 based upon access rights of a user's employee status. For example, a sales person may be provided with links to work centers relating to customer accounts and sales orders, while employees within the marketing division can be provided links to marketing work centers. The computer system 100 has a link management module 122 for placing one or more links on the page(s) 120. The link management module 122 accesses role-specific settings 124 to customize the contents of the pages 120 based upon the individual user's employee role.

In one implementation, the role-specific settings 124 available to the link management module 122 are similar to the role-specific settings 114 found within the work center management module 116. The role-specific settings 124 may dictate both which work center screens 112 are available to the particular user, as well as the manner in which to display the various links to work center screens 112 within the pages 120. For example, the role-specific settings 124 may include a priority ranking defining how to list links to work center screens 112, a method of grouping subsets of work center screens 112, etc. Other functional, design, or security related features may exist within the role-specific settings 124 and 114. For example, a link to a work center screen 112 may be provided, but access to the work center screen 112 may be protected by password or other security measure.

The computer system 100 may contain components in addition to those described above. Some remaining components of computer system 100 will be described further in the following. The computer system 100 may contain more, different, or fewer components than are described within this document without diverging from the capabilities described within this document. The computer system 100 may also be distributed amongst multiple systems. For example, the objects 103 may be accessible through an object database over a server or multiple servers, while the application programs 102, page management module 118, link management module 122, and work center management module 116 are located within a central computer system 100. The input device(s) 108 and output device(s) 110 may be attached to remote terminals accessing the computer system 100. Any other distribution of the components of computer system 100 is possible.

Figure 2:
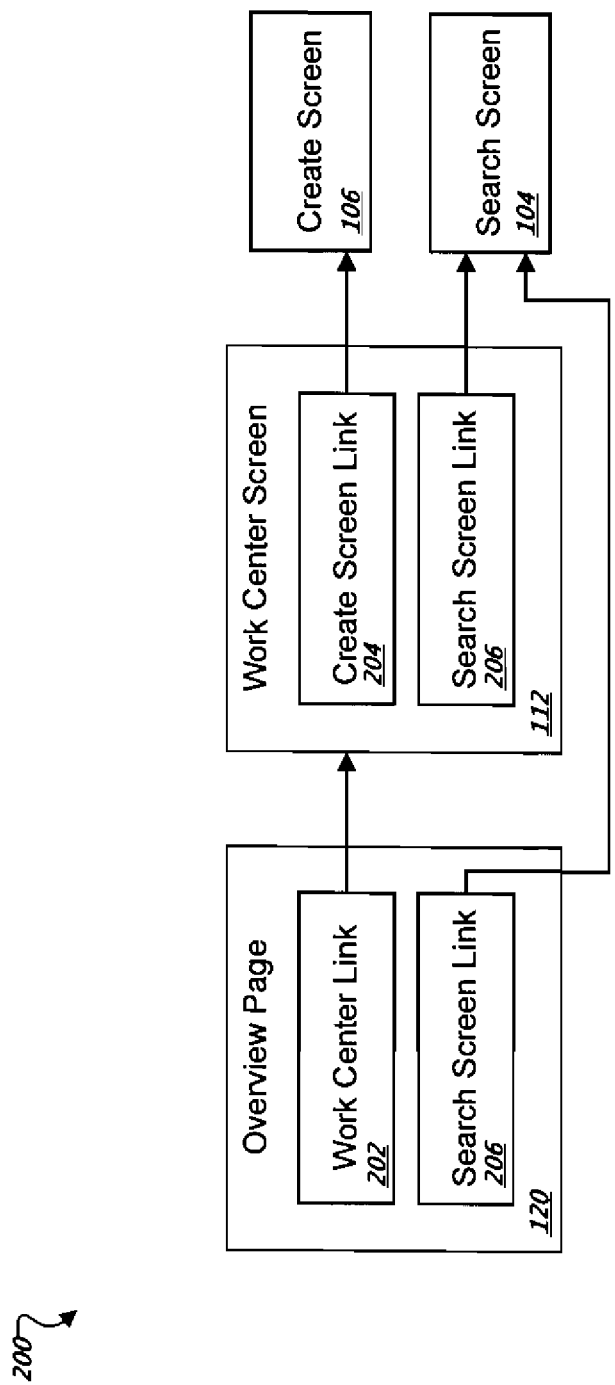
FIG. 2 is a block diagram of an exemplary navigation flow available from a page.

FIG. 2 shows a block diagram 200 of an exemplary navigation flow originating on the page 120, which here is an overview page. The overview page 120 contains a work center link 202 which connects to the work center screen 112. Any number of work center links 202 may exist within the overview page 120, each one navigating to a different work center screen 112.

The work center screen 112 contains a create screen link 204. The term "create screen" pertains to any document (e.g. new html page, pop-up window, java applet, etc.) which provides a way for a user to navigate through the process of creating a new instance of an object 103 (FIG. 1). Selection of the create screen link 204 (e.g. by clicking an HTML link, selecting an icon on a graphical user interface, etc.) provides the user access to the associated create screen 106. For example, if the work center screen 112 relates to customer records, the create screen 106 can provide access to creating a new customer record.

The work center screen 112 also contains a search screen link 206. The term "search screen" pertains to any document (e.g. new html page, pop-up window, java applet, etc.) which provides the user with a way of searching through some or all records in the system, for example using one or more object fields as a search parameter. Selection of the search screen link 206 provides the user access to the associated search screen 104. For example, if the work center screen 112 relates to sales orders, the search screen 104 can provide access to locating one or more particular sales orders.

In one implementation, the search screen may provide a number of different search parameters or search options, each parameter relating to a field within the sales order object 103. For example, the user may run a search to locate all sales orders for a particular customer, all sales orders for a particular product, or all sales orders within a date range, etc. In one implementation, multiple search screen links may exist within the work center screen 120, each search screen link 206 providing access to a different type of search, e.g. one search screen which allows a user to locate a particular sales order associated with a sales id or a customer/date combination, and another search screen which allows a user to find multiple sales order records based upon one or more sales order field values.

The overview page 120 also contains a search screen link 206. When the overview page 120 is to be populated with links, for example by the link management module 122 (as shown in FIG. 1), the search screen link 206 (existing on the work center screen 112) is identified as a type of link which the user should be able to use directly on the overview page 120. In one implementation, the role-specific settings 124 define which screen types may be directly navigated by the user. For example, the role-specific settings 124 for a particular user may define that the user is allowed to directly navigate to any create screen 106 which is attached to the work center screen(s) 112 available within the role-specific settings 124.

Accordingly, the overview page 120 is provided with the search screen link 206 as a navigation option associated with the work center screen 112, because the search screen link 206 is available within the work center screen 112 and is of a particular type designated for this direct availability. The presentation of the search screen link 206 within the overview page 120 illustrates this association. For example, the search screen link 206 may only be visible within the overview page 120 upon the user performing a mouse-over of the work center link 202. The search screen link 206 may be nested within or placed beside the work center link 202, to name other examples. That is, the search screen link 206 is available on the overview page 120 because it is one of the links that is also available if the user navigates to the work center screen 112, and the current placement eliminates the need for that navigation step if the user wants to activate the link.

In this example, the page where the search screen link 206 is provided is an overview page for an object. In another implementation, the link 206 can be provided on another type of the page 120 that links to the intervening work center page. Moreover, the links provided on the first page (whether it be on an overview page or other type of page) can optionally remain visible also after the user navigates to another page, such as to the work center page or to the search page.

Figure 3:
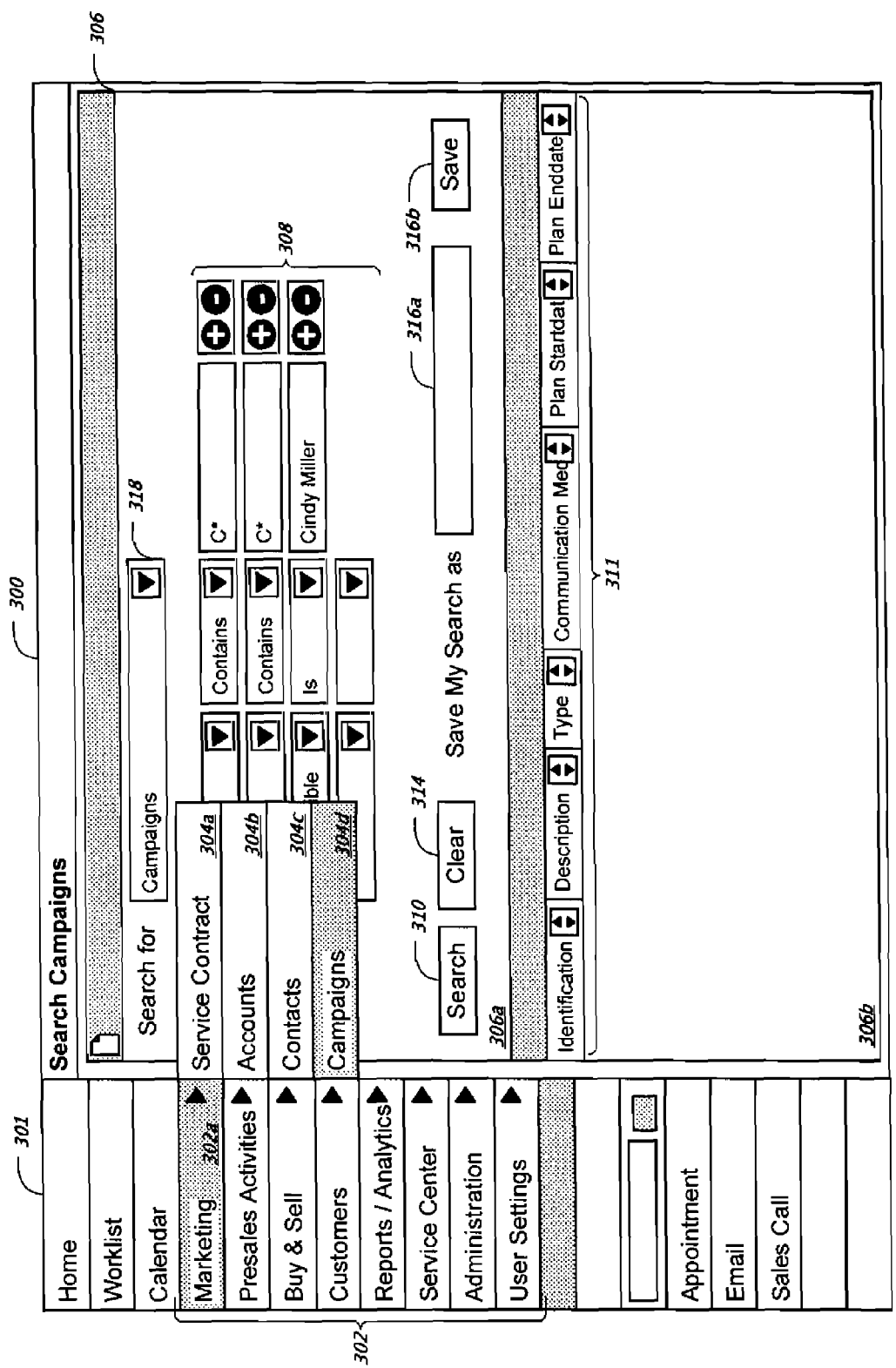
FIG. 3 is an exemplary page.

FIG. 3 shows an exemplary page 300 which may be used for accessing a CRM system. A column 301 contains a set of work center links 302 (e.g., Marketing, Presales Activities, Buy & Sell, Customers, Reports/Analytics, Service Center, Administration, and User Settings) which can be associated with the work center screens 112 (FIG. 1) and relate to one or more of the CRM database objects 103 (FIG. 1). Selection of any of the work center links 302 navigates the user to a corresponding one of the work center screens 112 (FIG. 1).

Figure 4:
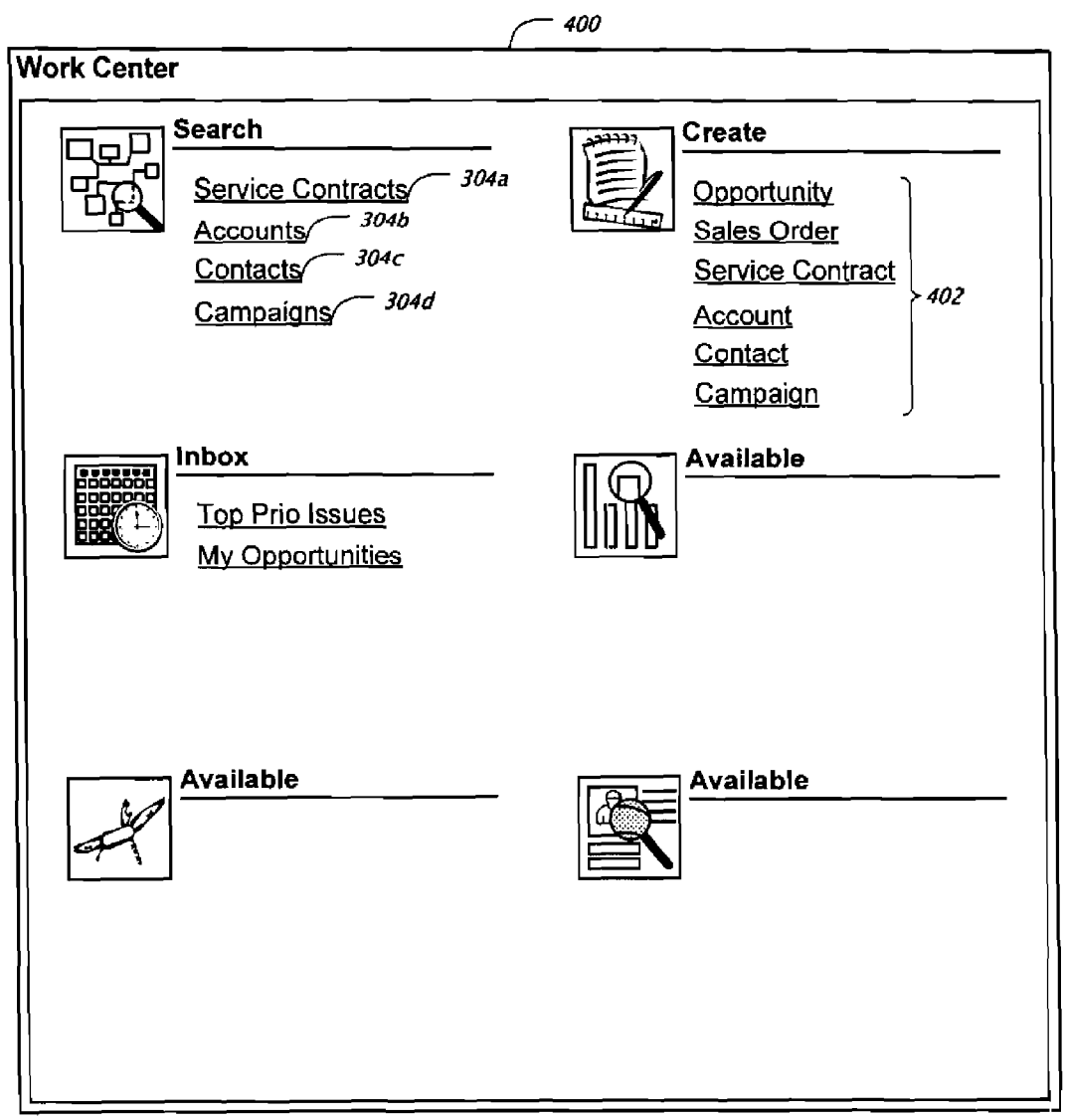
FIG. 4 is an exemplary work center screen.

For example, selection of a marketing work center link 302a connects the user to a marketing work center screen 400, illustrated in FIG. 4. The marketing work center screen 400 includes a campaigns search link 304d. The content of FIG. 4 can be role-specific, e.g. using the role-specific settings 114 in the work center management module 116 (in FIG. 1). Thus, a user can activate the link 302a to reach the content that is provided on the screen 400 for that user's role.

The page 300 also provides a sub-menu containing the links 304a-d in association with the marketing work center link 302a. The sub-menu in this example contains search screen links which may also be found within the marketing work center screen 400. A black arrow next to the title of a work center link 302, such as the marketing work center link 302a, indicates, in one implementation, that a mouse-over can provide access to sub-menus containing additional links which also reside within the work center screen 112 associated with the work center link 302.

Within the page 300, placing the cursor over the marketing work center link 302a has shown the sub-menu of marketing-related search screen links (e.g. service contract search link 304a, accounts search link 304b, contacts search link 304c, and campaigns search link 304d). In addition to search screen links, any type of link belonging to marketing work center screen 400 can be placed in the sub-menu 304 as well. For example, a create screen link 402 which exists within the marketing work center screen 400 may be provided as a quick navigation link within the sub-menu.

The links from the work center screen that are also provided on the page 300 need not be placed in a sub-menu available upon mouse-over. Rather, the links can be displayed in any way that indicates the association between them and the link to the work center screen where they also appear. Accordingly, the presentation of the links from the work center screen can serve as a shortcut for a user on the page 300, because the user need not visit the work center screen to have access to the one or more links available there.

If the campaigns search link 304d is selected from the sub-menu 304, the page 300 can present a campaigns search screen 306 to the user within the body of the page 300. Assume, for example, that the link 304d is activated on an overview page that includes at least the column 301 and the links 302. This activation, then, changes the overview page into a page with a focus on searching by presenting the search screen 306 together with the rest of the content. That is, the column 301 can remain visible on the search screen to facilitate further navigation. The search screen 306 here has a segmented window which allows for the search to be constructed in an upper portion 306a, while search results are displayed in a lower portion 306b.

Using the campaigns search screen 306, the user may search multiple fields 308 within the campaign object 103. For example, a user may search for a date range of a campaign, a type of campaign, or an employee assigned to a campaign. Once the fields 308 and associated values have been filled in appropriately, the user may select a search button 310 to run the search. The search results can then be listed within the lower screen portion 306b. A set of object fields 311 within the lower screen portion 306b may allow the user to arrange, sort, or otherwise manipulate the list of results obtained from a most recently run search. At any time, the user may also select to clear the contents of the fields 308 by selecting a clear button 314.

Using a save-as box 316a and an associated save button 316b, a specific search may be saved and later run without the user filling in individual field values. A control can be provided (not shown) for a user to selectively initiate any or all of the searches saved using the box 316a and the button 316b. Also, a search-for drop-down menu 318, in one implementation, can be used to switch between search pages of different objects. For example, the menu 318 can be used to switch from the currently shown search page for campaigns to another search page of accounts.

In one example, an employee within the marketing division may create a search for personally assigned campaigns and save the search as "my campaigns". Subsequently, selection of the "my campaigns" search in the control (not shown) may populate one or more of the fields 308 with values necessary to locate all records of campaigns assigned to that individual. Selection of the search button 310 allows the user to run this search.

The subset of links available within the marketing work center screen 400 shown within the marketing sub-menu on the page 300 can be role-specific, e.g. generated using the contents of the role-specific settings 124 in the link management module 122 (in FIG. 1). For example, the subset of links within sub-menu 304 associated with the marketing work center screen 400 which are presented for quick navigation from the page 300 may be based upon the role of the individual user who is logged into the page 300.

Optionally, there can be a third (or more) level in the sub-menu link hierarchy. Beginning, as shown on the page 300, at the link to a work center screen such as the marketing work center link 302a, a user can navigate to a nested accounts search screen link 304b. In one implementation, an additional sub-menu could be nested in association with the accounts search screen link 304b. Within the additional sub-menu, the user may be provided with links to other pages that are available through links located on the page to which the link 304b leads. The decision of which types of links are to be presented within the third hierarchical level can be role-specific as well. Any number of hierarchical levels could exist, depending upon the complexity of the CRM data base and/or the needs of the individual users. Accordingly, the third (and optionally any additional level of links presented) can provide a way for a user to shortcut from the page to specific pages available through links on pages that the user could also navigate to from the page, whether those links are located on a next following page in a navigation hierarchy, or further down a navigational hierarchy.

Figure 5:
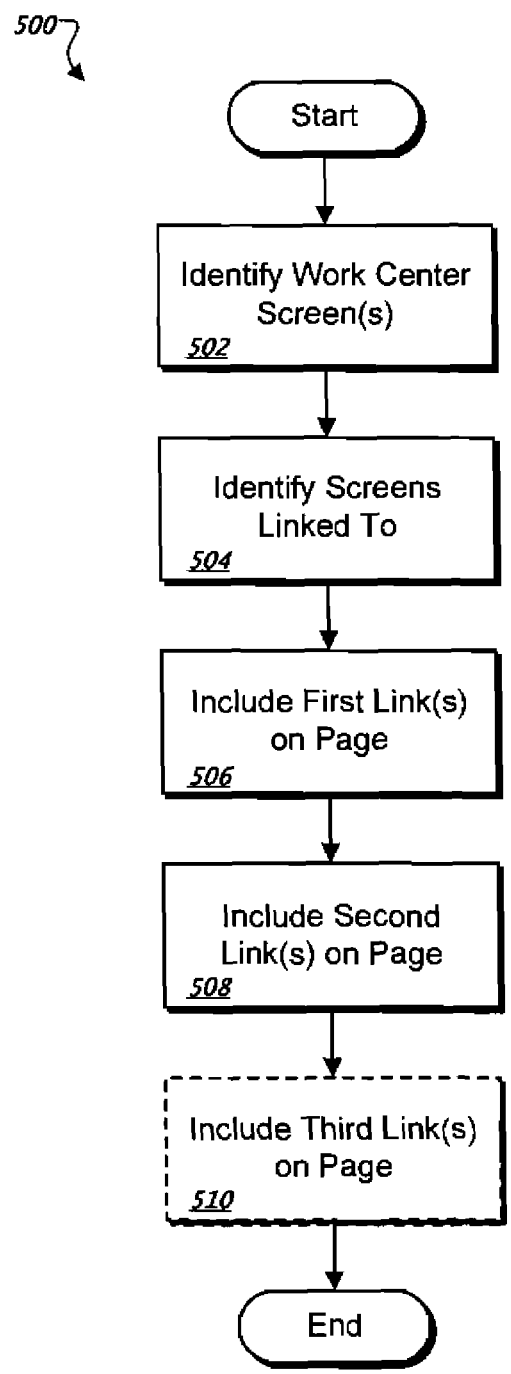
FIG. 5 is a flow chart of an exemplary method for populating a page with content links.

FIG. 5 is a flow chart of an exemplary method 500 for populating a page with one or more content links, for example the page 300 (FIG. 3). A page provided with such link(s) can act as a primary gateway for accessing navigational features which allow interaction with applications. These applications can, for example, provide content manipulation within a CRM system. In one implementation, the navigational features provided within the page may in part be based upon the individual user's role.

The method 500 begins by identifying one or more work center screens which are to be linked to from the page (step 502). A work center screen, for example the work center screen 400 (FIG. 4), provides a user with access to manipulating one or more object types within the CRM. The work center screen can group information that is related to a topic in the CRM, for example customer information or product information. Any number of work center screens can be linked to from the page. In one implementation, the type and number of work center screens available from within the page is dependent upon the role-specific settings 124 (FIG. 1) and navigable links to selected types of pages available at the work center screen(s) can be presented on the page.

Each work center screen can contain one or more links to additional information. These links can include links to application programs such as the application programs 102 (FIG. 1). In step 504, the method 500 identifies the various links available on each work center screen identified within step 502. In one implementation, the links associated with work center screens provide access to adding objects, modifying existing objects, and searching for objects, to name some examples.

Once all links to work center screens have been identified, they can be included on the page. The method 500 provides that one or more first links are included on the page (step 506). For example, the links 302 can be included on the page 300.

One or more second links can also be added to the page (step 508). This at least one second link leads to a screen of a particular type that is also available on the identified work center screen. For example, the links 304*a-d* can be included on the page 300, in association with the link 302*a*. In one implementation, the second links may be visible only upon the mouse-over of one of the first set of links. In one implementation, a mouse-over of a work center screen link will open a menu containing one or more application links which reside within that work center screen (as shown in FIG. 3). The addition of the second set of links to the page may be based, in one implementation, upon the role-specific setting 114 associated with the user.

Optionally, the method 500 may include adding a third set of links to the page (step 510). The third set of links can be displayed with any relationship to the first set of links or the second set of links (e.g. as a drop-down menu, pop-up menu available upon mouse-over, mouse-over nesting within a graphical icon, visual grouping of links in a hierarchy beneath the second set of links, etc). The third set of links may provide links that are also available on the pages to which the second set of links lead. For example, from the pages that the links 304*a-d* lead to there can be retrieved links of one or more specific types, and these can be presented on the page 300 as an additional level of link shortcuts. Additional links can also be used.

In one implementation, the method 500 described above is performed by the page management module 118 (FIG. 1). The method 500 may be performed in a different order than described above and more or fewer steps may be included. The population of the page with the first, second, and third links can be done dynamically, for example upon the user requesting the work center screen.

Figure 6:
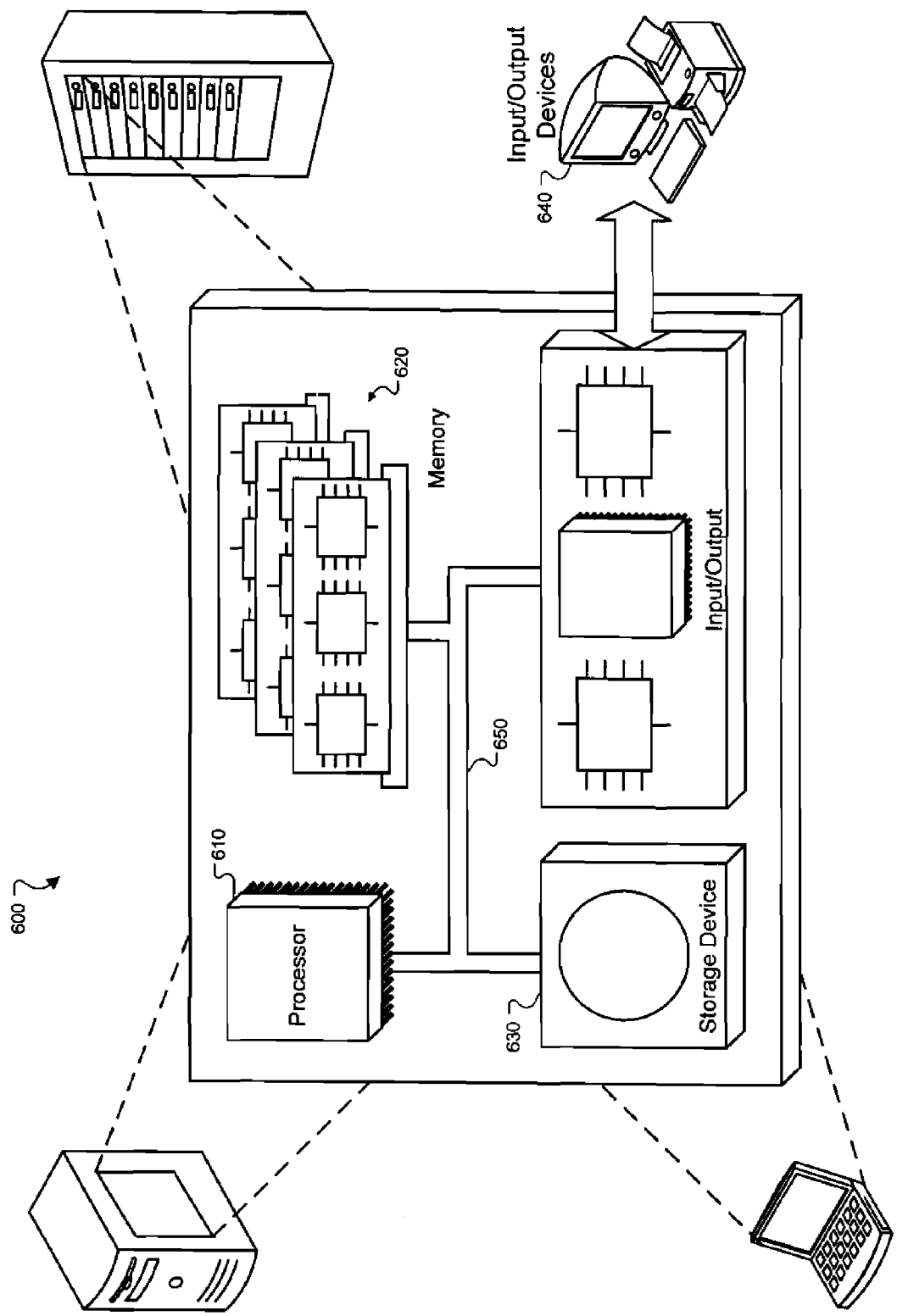
FIG. 6 is a block diagram of a computing system that can be used in connection with computer-implemented methods described in this document.

FIG. 6 is a schematic diagram of a generic computer system 600. The system 600 can be used for the operations described in association with any of the computer-implement methods described previously, according to one implementation. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method, comprising:
    displaying, by a computing system, a first page that includes a first link that is configured to cause navigation from the first page to a second page in response to a first type of user selection of the first link, wherein the second page includes multiple second links that are configured to cause navigation to multiple third pages, respectively;
    receiving, by the computing system, a second type of user selection of the first link in the first page;
    identifying, by the computing system, a role of a user who has logged in to view the first page based upon an employee status of the user;
    identifying, by the computing system, that a setting that is specific to the role of the user specifies a particular type of page, from among a collection of different types of pages, to which the first page should provide direct navigation;
    determining, by the computing system, a subset of the second links in the second page to include in a menu on the first page based upon an identification that the subset of the second links are configured to provide navigation to those of the third pages that are of the particular type of page; and
    displaying, by the computing system and as a result of having received the second type of user selection of the first link and as a result of having determined the subset of the second links in the second page to include in the menu on the first page, the menu on the first page with the subset of the second links in the menu.

2. The computer-implemented method of claim 1, wherein the second type of user selection of the first link involves placing a cursor over the first link without clicking the first link.

3. The computer-implemented method of claim 2, wherein the first type of user selection of the first link includes clicking the first link.

4. The computer-implemented method of claim 1, further comprising receiving, by the computing system, user selection of a specific one of the subset of the second links in the menu and, as a result, causing navigation from the first page directly to a specific one of the third pages to which the specific one of the subset of the second links is configured to cause navigation.

5. The computer-implemented method of claim 1, further comprising receiving, by the computing system, the first type of user selection of the first link and, as a result, displaying, by the computing system, the second page with the multiple second links included on the second page.

6. The computer-implemented method of claim 5, wherein displaying the second page with the multiple second links included on the second page includes providing the menu for display on the second page with the subset of the second links in the menu.

7. The computer-implemented method of claim 1, wherein the particular type of page is a search page, such that those of the third pages that are of the particular type of page are search pages in distinction to being other types of pages, wherein the search page is a type of page that provides the user with a way of searching through some or all records in a system.

8. The computer-implemented method of claim 1, wherein the menu does not include a link that is configured to cause navigation to any of the third pages that are not the particular type of page.

9. A machine-readable storage device including instructions that, when executed by one or more computer processors, cause performance of operations that comprise:
    displaying, by a computing system, a first page that includes a first link that is configured to cause navigation from the first page to a second page in response to a first type of user selection of the first link, wherein the second page includes multiple second links that are configured to cause navigation to multiple third pages, respectively;
    receiving, by the computing system, a second type of user selection of the first link in the first page;
    identifying, by the computing system, a role of a user who has logged in to view the first page based upon an employee status of the user;
    identifying, by the computing system, that a setting that is specific to the role of the user specifies a particular type of page, from among a collection of different types of pages, to which the first page should provide direct navigation;
    determining, by the computing system, a subset of the second links in the second page to include in a menu on the first page based upon an identification that the subset of the second links are configured to provide navigation to those of the third pages that are of the particular type of page; and
    displaying, by the computing system and as a result of having received the second type of user selection of the first link and as a result of having determined the subset of the second links in the second page to include in the menu on the first page, the menu on the first page with the subset of the second links in the menu, wherein the menu does not include a link that is configured to cause navigation to any of the third pages that are not the particular type of page.

10. The machine-readable storage device of claim 9, wherein the second type of user selection of the first link involves placing a cursor over the first link without clicking the first link.

11. The machine-readable storage device of claim 10, wherein the first type of user selection of the first link includes clicking the first link.

12. The machine-readable storage device of claim 9, further comprising receiving, by the computing system, user selection of a specific one of the subset of the second links in the menu and, as a result, causing navigation from the first page directly to a specific one of the third pages to which the specific one of the subset of the second links is configured to cause navigation.

13. The machine-readable storage device of claim 9, wherein the operations further comprise, by the computing system, the first type of user selection of the first link and, as a result, displaying, by the computing system, the second page with the multiple second links included on the second page.

14. The machine-readable storage device of claim 13, wherein displaying the second page with the multiple second links included on the second page includes providing the menu for display on the second page with the subset of the second links in the menu.

15. The machine-readable storage device of claim 9, wherein the particular type of page is a search page, such that those of the third pages that are of the particular type of page are search pages in distinction to being other types of pages, wherein the search page is a type of page that provides the user with a way of searching through some or all records in a system.

* * * * *